(12) United States Patent
Garvin

(10) Patent No.: US 7,509,855 B2
(45) Date of Patent: Mar. 31, 2009

(54) SENSOR MANIFOLDS

(75) Inventor: Gary A. Garvin, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 11/782,860

(22) Filed: Jul. 25, 2007

(65) Prior Publication Data

US 2009/0025472 A1 Jan. 29, 2009

(51) Int. Cl.
G01F 5/00 (2006.01)
(52) U.S. Cl. ........................................ 73/202
(58) Field of Classification Search ............... 73/202.5, 73/202, 204.21, 861.19, 204.22
See application file for complete search history.

(56) References Cited

U.S. PATENT DOCUMENTS

| | | | | |
|---|---|---|---|---|
| 4,930,357 A * | 6/1990 | Thurston et al. | ......... | 73/861.19 |
| 6,173,617 B1 * | 1/2001 | Zarudiansky | ............ | 73/861.19 |
| 6,886,401 B2 * | 5/2005 | Ito et al. | ........................ | 73/202 |
| 7,059,184 B2 * | 6/2006 | Kanouda et al. | ............ | 73/202.5 |
| 2005/0183500 A1 | 8/2005 | Kanouda et al. | | |

OTHER PUBLICATIONS

Search Report form corresponding International application PCT/US2008/070695 dated Sep. 19, 2008.

* cited by examiner

*Primary Examiner*—Jewel Thompson
(74) *Attorney, Agent, or Firm*—Christopher D. Hilker; David M. Shold; Teresan W. Gilbert

(57) ABSTRACT

Sensor manifolds include a housing having at least two fluid flow passages communicating with fluid entry and exit ports in the housing that are connectable in line in a full flow fluid line in a system. One or more sensor ports in the housing communicate with one or more of the flow passages for housing one or more sensors for sensing one or more characteristics, qualities or conditions of the fluid flowing through the housing without subjecting the sensor to the full fluid flow through the housing.

18 Claims, 2 Drawing Sheets

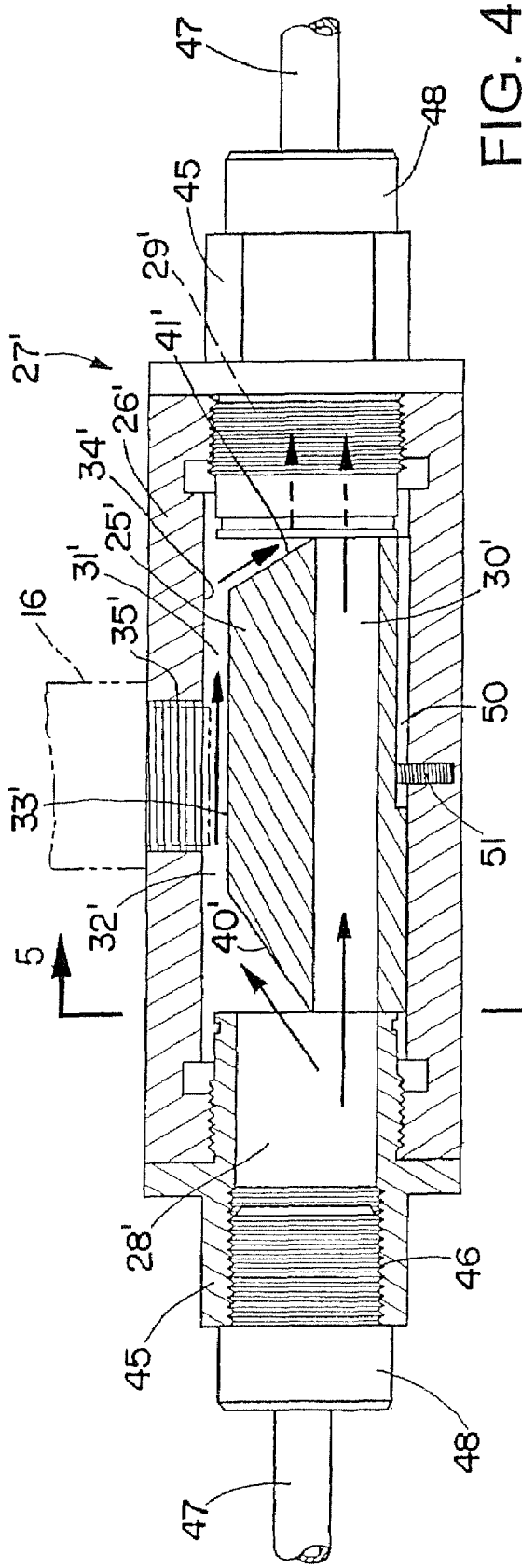
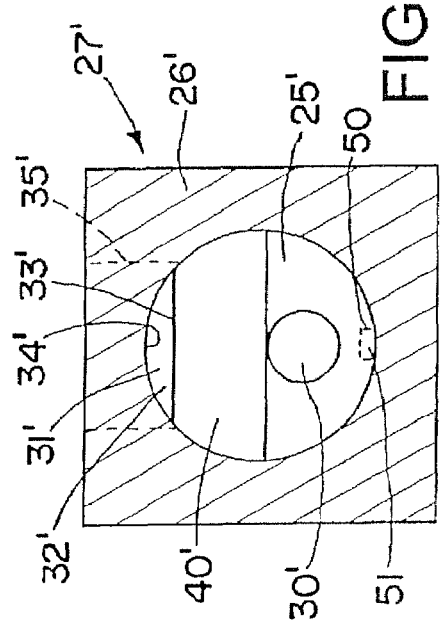
FIG. 4
FIG. 5

SENSOR MANIFOLDS

FIELD OF THE INVENTION

The present invention relates to sensor manifolds that are designed to be installed in line in functional full flow fluid lines in systems without any auxiliary equipment or return lines and allow one or more auxiliary sensors to function on the fluid without being subjected to a full flow environment.

BACKGROUND OF THE INVENTION

Various devices are oftentimes used to disrupt or alter functional full fluid flows to industrial or automotive equipment and the like for diverting a portion of the fluid to a bypass loop which supplies the fluid to a secondary device where sensors are used to sense one or more characteristics, qualities or conditions of the fluid. Thereafter the diverted fluid is returned independently to a sump or other connection point other than the provided OEM return point. Some applications also incorporate a larger type vessel to house a much larger portion of the fluid which in essence causes the fluid to slow down. While these devices may perform satisfactorily, they have a major drawback of either requiring some alteration to the equipment which may be objectionable to the OEM and/or end user or presenting other downside issues such as ancillary equipment or other service issues that have to be addressed.

SUMMARY OF THE INVENTION

The present invention overcomes the foregoing drawbacks by providing sensor manifolds that are designed to be installed in line in functional full flow fluid lines in systems for industrial and automotive equipment and the like to allow various industrial or automotive sensors to function therefrom without subjecting the sensors to the full flow fluid environment and without the need for any ancillary equipment, auxiliary return lines or deposit issues beyond that of the industrial or automotive equipment with which the fluid lines are associated. The system fluids include but are not limited to lubricants, industrial gear oil, hydraulic oil, driveline fluids, automotive fluids and the like.

In accordance with one aspect of the invention, the sensor manifolds include a housing containing at least two flow passages each communicating with housing entry and exit ports, and one or more sensor ports communicating with one or more of the flow passages for housing one or more sensors for sensing one or more characteristics, qualities or conditions of the fluid flowing therethrough.

In accordance with another aspect of the invention, the flow passages may take different configurations depending on the fluid being monitored and the needs of the sensor or sensors.

In accordance with another aspect of the invention, the flow passages may be configured to cause a greater amount of the fluid entering the entry port to flow through one of the flow passages than through another of the flow passages.

In accordance with another aspect of the invention, the flow rate through at least one of the flow passages may be regulated or controlled depending on the fluid that is being monitored and the needs of the sensor or sensors.

In accordance with another aspect of the invention, a flow diverter may be mounted in the housing between the entry and exit ports for establishing the flow passages in the housing.

In accordance with another aspect of the invention, differently configured flow diverters may be selectively mountable within the housing to provide different flow passage configurations within the housing depending on the fluid that is being monitored and the needs of the sensor or sensors.

In accordance with another aspect of the invention, adaptor end caps may be connected to the housing entry and exit ports to facilitate in line insertion of the sensor manifold in a functional fluid line.

In accordance with another aspect of the invention, at least one of the flow passages in the housing may be formed by a through hole in the flow diverter, and another of the flow passages may be formed by a gap between an inner wall portion of the housing and an outer wall portion of the flow diverter that is sized to control the width and depth of the another flow passage to control the amount of fluid to which a sensor housed in a sensor port in communication with the another flow passage is exposed at any given time.

In accordance with another aspect of the invention, the adaptor end caps may be moved into engagement with opposite ends of the flow diverter to locate the flow diverter axially within the housing and assist in diverting some of the fluid flow entering the entry port to the another flow passage.

In accordance with another aspect of the invention, the upstream end of the flow diverter outer wall portion may be angled outwardly away from the adaptor end cap at the entry port to divert a portion of the fluid flow entering the entry port to the another flow passage.

In accordance with another aspect of the invention, the downstream end of the flow diverter outer wall may be angled inwardly toward the adaptor end cap at the exit port to control the amount of fluid flow through the another flow passage.

These and other advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

The present invention may be more readily understood by reference to the following drawings in which:

FIG. 4 is a schematic fragmentary longitudinal section through yet another form of sensor manifold of the present invention; and FIG. 5 is a transverse section through the sensor manifold of FIG. 4 taken on the plane of the line 5-5 thereof.

DETAILED DESCRIPTION

The sensor manifolds of the present invention are designed to be installed in line in full flow fluid lines in systems for industrial or automotive equipment and the like without the need for any ancillary equipment, auxiliary return lines or deposit issues beyond that of the industrial or automotive equipment to which the functional fluid lines are connected, and allow for virtually any industrial or automotive sensors to function therefrom without subjecting the sensors to the full flow fluid environment. The system fluids include but are not limited to lubricants, industrial gear oil, hydraulic oil, driveline fluids, automotive fluids and the like. The ISO viscosity grade of the fluids may be in the range of about 22 to about 6000, or within the range of about 220 to about 680, or within the range of about 220 to about 460.

Figure 1:
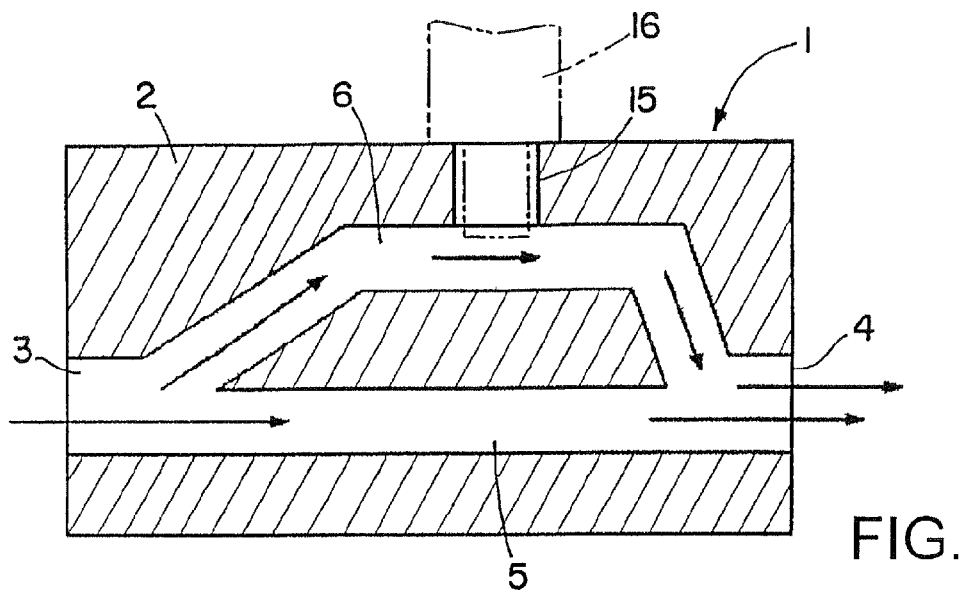
FIG. 1 is a schematic longitudinal section through one form of sensor manifold of the present invention.

Referring now in detail to the drawings, wherein the same reference numbers followed by prime symbols are used to designate like parts, and initially to FIG. 1, there is shown one form of sensor manifold 1 of the present invention including a housing 2 having fluid entry and exit ports 3, 4 to which fluid connections may be made in line in a full flow fluid line of a system as by disconnecting a flexible functional full flow fluid line to or from a pump of a piece of industrial or automotive equipment and pulling the flexible line back to provide room to install the manifold in line. Alternatively, a portion of the functional full flow fluid line to or from the pump may be cut out so that unions may be attached to the cut ends for connection of the cut ends to the entry and exit ports 3, 4 of the sensor manifold 1 as described for example in connection with the sensor manifold shown in FIG. 4.

Figure 2:
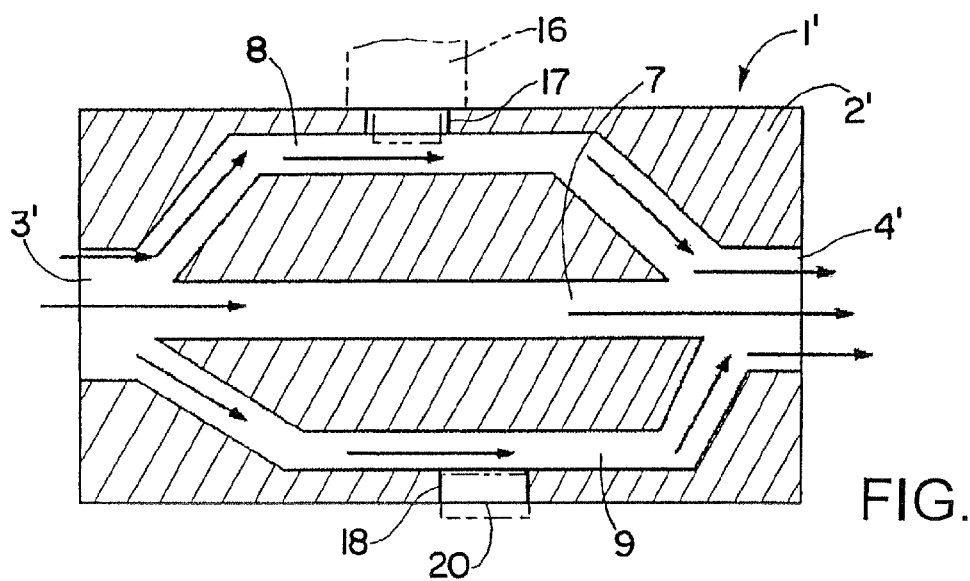
FIG. 2 is a schematic longitudinal section through another form of sensor manifold of the present invention.

Within the manifold housing are two or more flow passages communicating with both the entry and exit ports to partition the fluid flow therebetween. FIG. 1 shows a sensor manifold 1 with two such flow passages 5, 6 between the entry and exit ports 3, 4, whereas FIG. 2 shows a sensor manifold 1' having three such flow passages 7, 8, 9. However, it should be understood that more than three such flow passages may also be provided in the manifold housing depending on the type of fluid flowing therethrough and the needs of the sensor or sensors being used to sense one or more characteristics, qualities or conditions of the fluid.

Moreover, the size of one or more of the flow passages through the sensor manifolds may be varied to vary the flow rate and/or depth of the fluid flow through one or more of the flow passages to control the amount of fluid that is exposed to any sensor or sensors housed in one or more sensor ports communicating with one or more of the fluid passages at any given time. FIG. 1 shows one sensor port 15 communicating with one of the flow passages 6 in the sensor housing 2 for housing one sensor 16 (shown in phantom lines), whereas FIG. 2 shows two sensor ports 17, 18 communicating with two different flow passages 8, 9 in the manifold housing 2' for housing one or two sensors 16. However, it should be understood that any number of sensor ports may be provided in the manifold housings communicating with one or more of the flow passages for housing one or more sensors. Any sensor port that does not house a sensor may be closed by a suitable plug 20, one of which is schematically shown in FIG. 2.

FIGS. 1 and 2 schematically show the flow passages formed directly in the walls of the manifold housings. However, a flow diverter may be mounted in the manifold housings to provide the desired number of flow passages therein.

Figure 3:
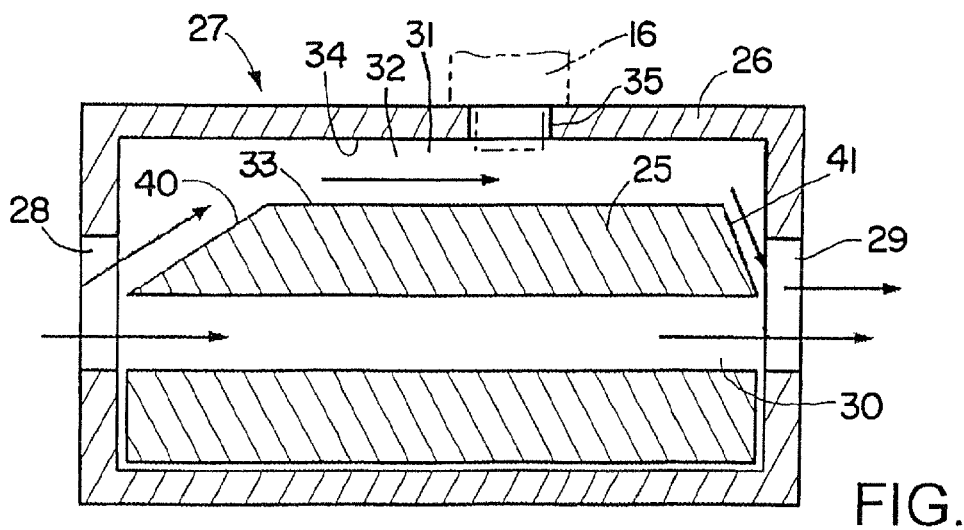
FIG. 3 is a schematic longitudinal section through still another form of sensor manifold of the present invention.

FIG. 3 shows one such flow diverter 25 mounted in the housing 26 of a sensor manifold 27 between entry and exit ports 28, 29 for establishing two flow passages 30, 31 therebetween. One of the flow passages 30 may be formed by a through passage in the flow diverter, whereas the other flow passage 31 may be formed by a gap 32 between an outer wall portion 33 of the flow diverter 25 and an inner wall portion 34 of the housing 26. FIG. 3 also shows a sensor port 35 for housing a sensor 16 communicating with the other flow passage 31 which may be sized by controlling the width and depth of gap 32 to control the amount and depth of the fluid flow through flow passage 31 and thus the amount of fluid exposed to the sensor 16 at any given time. Also the upstream end 40 of the flow diverter outer wall portion 33 may be angled outwardly in close proximity to the entry port 28 for diverting a portion of the fluid flow entering the entry port to the flow passage 31 and the downstream end 41 of the flow diverter outer wall portion 33 may be angled inwardly in close proximity to the exit port 29 for controlling the amount of fluid flow through flow passage 31 as further shown in FIG. 3.

These flow rates through the different flow passages 30, 31 in sensor manifold 27 may be controlled by changing the through hole size 30 in the flow diverter 25 and/or the entry and exit angles of the upstream and downstream ends 40, 41 of the flow diverter outer wall portion 33. Moreover, any one of a plurality of flow diverters 25 of different configurations may be selectively mountable within the sensor manifold housing 26 to provide different flow passage configurations within the housing depending on the fluid that is being monitored and the needs of the sensor or sensors associated therewith.

For ease of assembly and replacement of the flow diverters, the entry port 28' and/or exit port 29' may be sized to allow for insertion of a flow diverter 25' into the housing 26' and removal therefrom through the entry and/or exit ports of the sensor manifold 27' shown in FIGS. 4 and 5. Also FIG. 4 shows adaptor end caps 45 threadedly connected to the entry and exit ports 28', 29' for removably retaining the flow diverter within the manifold housing. These adaptor end caps may be made to engage opposite ends of the flow diverter 25' to locate the flow diverter axially within the housing and assist in diverting some of the fluid flow entering the entry port 28' to the flow passage 31' formed by the gap 32' between the inner wall portion 34' of housing 26' and the outer wall portion 33' of flow diverter 25'. Also these adaptor end caps 45 may be used for in line mounting of the sensor manifold in a full flow fluid line in a system by providing internally threaded sockets 46 in the outer ends of the adaptor end caps for direct connection to a flexible full flow fluid line after disconnecting the flexible fluid line at a pump or the like and pulling the flexible fluid line back to provide room to install the sensor manifold 27' in the line or by cutting out a portion of a full flow fluid line 47 and attaching unions 48 to the cut ends of the fluid line 47 for connection of the cut ends to the adaptor end caps as schematically shown in FIG. 4.

Rotation of the flow diverter 25' within housing 26' may be prevented in any suitable manner, for example, by providing a longitudinal slot 50 in the bottom of the flow diverter 25 that is engaged by a key 51 extending from the housing into the slot as further shown in FIG. 4.

Although only a few embodiments of the present invention have been described, it should be appreciated that many modifications can be made without departing from the spirit and scope of the invention. All such modifications are intended to be included within the scope of the present invention, which is to be limited only by the following claims.

What is claimed is:

1. A sensor manifold comprising a housing having fluid entry and exit ports, at least two fluid flow passages in the housing communicating with the entry and exit ports to partition fluid flow between the entry and exit ports, and at least one sensor port in the housing communicating with at least one of the flow passages for housing a sensor for sensing one or more characteristics, qualities or conditions of a fluid flowing through the housing without subjecting the sensor to the full fluid flow through the housing; wherein the fluid has an ISO viscosity grade in the range of about 22 to about 6000.

2. The sensor manifold of claim 1 wherein the flow passages are configured to cause a greater amount of fluid entering the entry port to flow through one of the flow passages than through another of the flow passages.

3. The sensor manifold of claim 1 further comprising means for regulating or controlling the flow rate through the at least one of the flow passages.

4. The sensor manifold of claim 1 wherein the flow rate through at least one of the flow passages is controlled by an entry angle or exit angle of the at least one flow passage relative to the entry port or exit port, respectively.

5. The sensor manifold of claim 1 wherein a flow diverter is mounted in the housing between the entry and exit ports for establishing the at least two flow passages.

6. The sensor manifold of claim 5 wherein the flow diverter has at least one through passage that forms one of the flow passages in the housing and an outer wall portion that defines with an inner wall portion of the housing at least one other flow passage in the housing.

7. The sensor manifold of claim 6 wherein the at least one sensor port communicates with the other flow passage which is formed by a gap between the inner wall portion of the housing and the outer wall portion of the flow diverter that is sized to control the depth and width of the fluid flow through the other flow passage and thus the amount of fluid exposed to a sensor in the at least one sensor port at any given time.

8. The sensor manifold of claim 6 wherein the outer wall portion of the flow diverter has an outwardly angled upstream end portion in close proximity to the entry port for diverting a portion of the fluid flow entering the entry port to the other flow passage.

9. The sensor manifold of claim 6 wherein the outer wall portion of the flow diverter has an inwardly angled downstream end portion in close proximity to the exit port for controlling the amount of fluid flow through the other flow passage.

10. The sensor manifold of claim 5 wherein any one of a plurality of different flow diverters of different configurations are selectively mountable within the housing to provide different flow passage configurations within the housing depending on the fluid that is being monitored and the needs of the sensor or sensors.

11. The sensor manifold of claim 5 wherein the flow diverter is removably mounted within the housing, and means are provided for preventing rotation of the flow diverter inside the housing.

12. The sensor manifold of claim 1 further comprising adaptor end caps connected to the entry and exit ports to facilitate in line mounting of the sensor manifold in a full flow fluid line.

13. The sensor manifold of claim 12 wherein the adaptor end caps are threadedly connected to the entry and exit ports to facilitate insertion of a flow diverter into the housing for establishing the at least two flow passages, the adaptor end caps being engageable with opposite ends of the flow diverter to locate the flow diverter axially within the housing and assist in diverting a portion of the fluid flow entering the entry port to the other flow passage.

14. A sensor manifold comprising a housing having fluid entry and exit ports connectable in line in a full flow fluid line in a system, a flow diverter within the housing between the entry and exit ports for establishing at least two flow passages in the housing between the entry and exit ports, and at least one sensor port in the housing communicating with at least one of the flow passages for housing a sensor for sensing one or more characteristics, qualities or conditions of the fluid flowing through the housing without subjecting the sensor to the full fluid flow through the housing; wherein the fluid has an ISO viscosity grade in the range of about 22 to about 6000.

15. The sensor manifold of claim 14 wherein at least one of the flow passages is formed by a through hole in the flow diverter, and another of the flow passages is formed by a gap between an inner wall portion of the housing and an outer wall portion of the flow diverter that is sized to control the width and depth of the another flow passage to control the amount of fluid to which a sensor housed in a sensor port in communication with the gap is exposed at any given time.

16. The sensor manifold of claim 15 further comprising adaptor end caps threadedly connected to the entry and exit ports, respectively, to facilitate insertion of the flow diverter into the housing and removal therefrom, the adaptor end caps being engageable with opposite ends of the flow diverter to locate the flow diverter within the housing and assist in diverting some of the fluid flow entering the entry port to the another flow passage.

17. The sensor manifold of claim 16 wherein the outer wall portion of the flow diverter has an upstream end portion that is angled outwardly from the adaptor end cap at the entry port for diverting a portion of the fluid flow entering the entry port to the another flow passage and a downstream end portion that is angled inwardly toward the adaptor end cap at the exit port for controlling the amount of fluid flow through the another flow passage.

18. The sensor manifold of claim 14 wherein any one of a plurality of different flow diverters having different configurations is selectively mountable within the housing to provide different flow passage configurations in the housing.

* * * * *